Patented Aug. 31, 1943

2,328,140

UNITED STATES PATENT OFFICE 2,328,140

CATALYST RESULTING FROM HYDROLYSIS OF ALLOYS OF CATALYTIC METALS AND HYDROLYZABLE METALS

John H. Hahn, St. Louis, Mo., assignor to Monsanto Chemical Company, St. Louis, Mo., a corporation of Delaware No Drawing. Application April 21, 1939, Serial No. 269,179

14 Claims. (Cl. 260—563)

The present invention relates to hydrogenation, amination and deamination reactions and refers particularly to improved metallic catalytsts capable of promoting such reactions and to methods of preparing such catalysts.

It is an object of the present invention to improve the yield and to facilitate in other manners the catalytic hydrogenation, amination or deamination of unsaturated organic substances. A further object is to provide a new and improved form of catalyst suitable for promoting and advantageously effecting such reactions. Other objects and advantages of the invention will be apparent from the description hereinafter.

For the hydrogenation, amination or deamination of organic substances a large number of catalysts have been heretofore recommended. Among the best of these catalysts are those formed by hydrolysis of alloys of catalytically active metals such as nickel, cobalt, iron, copper, etc. and such hydrolyzable metals as aluminum, magnesium, and the alkaline-earth metals, including calcium, barium and strontium. The hydrolyzable metals are all above hydrogen in the electromotive series. Such catalysts are described more fully in Bertsch, United States Patent Number 2,132,389 and elsewhere.

In the preparation of such catalysts, the alloy, for example, an alloy of one part of nickel and two parts of aluminum, in powdered or granular form, is hydrolyzed by boiling with water. Procedures have been described whereby the temperature of hydrolysis can be increased by adding to the water a water-soluble substance which will increase the boiling point of the water or by treating the alloy with steam under pressure.

The hydrolyzed material is then separated from the water, preferably by filtration, and is then washed. The catalyst as thus prepared is used directly or may be stored for future use in the form of a wet paste or suspension in water. Catalysts prepared by this method lose their activity on aging and are affected in other ways by storage.

I have now discovered that catalysts of the foregoing type which are not substantially affected by storage and which are more active than other catalyst preparations of this type that were heretofore known, can be prepared by conducting the hydrolysis under controlled conditions in the presence of an organic liquid, preferably the liquid to be hydrogenated. By preparing the catalyst in this manner I have been able to obtain greater yields of desired products than were heretofore obtainable with catalysts of this type and I have been able to provide catalyst preparations whose activity is not substantially impaired over long periods of time.

As an example of the method of preparing a catalyst according to the principles of my invention the following is typical.

An alloy consisting of one part of nickel and two parts of magnesium in particulate form (shavings, turnings, chips, filings, preferably fragments or particles of a size of the order of rice or wheat grains) is added to approximately five times its weight of aniline. The mixture is kept stirred and a quantity of water equal to the weight of the alloy is thereafter added. While the mixture is stirred the temperature is raised slowly to from 130° C. to about 160° C. and maintained until substantially complete hydrolysis of the alloy has taken place. The degree to which heating must be carried is determinable by previous test. The temperature need not be raised beyond the boiling point of water, for example, whereupon the period required for substantially complete hydrolysis will be a matter of hours. When the tempertaure is raised to 160° C. as described, approximately 20 hours at this temperature is sufficient. The temperature may be raised beyond 160° C. to hasten the hydrolysis but it will be limited by the boiling point of the organic liquid at the particular pressure in the presence of which the hydrolysis is conducted. Pressure may be used in the hydrolysis if desired to hasten the hydrolysis, particularly when the hydrolysis is being conducted in the presence of low-boiling liquids.

In the foregoing example, equal parts of water and the alloy, two-thirds of which is magnesium, have been used. This quantity is almost exactly the quantity of water which is stoichiometrically required to hydrolyze the magnesium present. The optimum proportion to use for the hydrolysis is that quantity which is stoichiometrically required to hydrolyze the magnesium quantitatively to magnesium hydroxide according to the reaction:

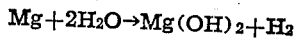

$$Mg + 2H_2O \rightarrow Mg(OH)_2 + H_2$$

Variations of as little as 2% less than the quantity of water actually required to hydrolyze the foregoing nickel-magnesium alloy according to the equation yield catalysts whose decrease in activity is detectable, as measured by the actual yields obtained in the reactions in which they are used. In using the alkaline-earth metals which, like magnesium, are divalent, approximately the same stoichiometric proportions, that is, one mol of the metal in the alloy to two mols of water, are to be observed. With aluminum, a trivalent metal, the stoichiometric relation to be used is approximately one mol of aluminum to three mols of water. However, this range of water proportions may vary slightly from the optimum since it has not yet been possible to determine whether the character of the particular reaction being catalyzed or the proportions of the metals in the alloys or the nature of the different metals in the alloys has any great effect on the optimum range of water of hydrolysis or whether these proportions are true optima. Furthermore, in my experiments it has not been possible to account for water lost by vaporization. In all cases, however, these catalysts which were prepared according to the above proportions had greater activity and gave more readily reproducible results than those made by hydrolysis and subsequent washing with an excess of water according to the former procedures.

In preparing catalysts of this type it was formerly necessary to use water of controlled purity. Small proportions of chlorine or salts in the water had a deleterious effect on the catalyst. Inasmuch as the method of my invention utilizes only a small controlled proportion of water with reference to the proportion of alloy, the small proportions of impurities found in ordinary drinking water are in most instances relatively insignificant and have no substantial effect on the activity of the catalyst. However, inasmuch as so little water is required in the preparation of the catalysts of this invention, the use of distilled water is preferred because of its substantial freedom from impurities of any kind and since the cost of the prepared catalyst is not increased materially thereby.

The catalyst obtained according to the present invention is substantially dry, that is, it is free from water, inasmuch as the water which was added is combined with the hydrolyzable metal of the alloy used in the preparation of the catalyst. Heretofore in the preparation of catalysts of the hydrolyzed nickel-aluminum-alloy type it has been necessary to wash the hydrolyzed catalysts with water to remove insoluble salts. In the preparation of such catalysts which are highly adsorptive if the washing was conducted with impure water it is probable that the impurities were adsorbed on the catalyst and thereby affected the catalyst. My improved catalysts after the hydrolysis with a controlled proportion of water are not subjected to any washing procedure and are much more active than heretofore known catalysts of this type.

In the controlled hydrolysis according to the present invention it is advantageous, particularly in those reactions where alkali has a desirable function, to add slight proportions of alkali to the water used in the hydrolysis. Thus, in the hydrogenation of aniline to cyclohexylamine, in which the formation of dicyclohexylamine and other high boiling substances is reduced by adding sodium hydroxide, sodium carbonate or similar alkalies to the reaction mixture, it has been found that addition of the alkali to the water used for hydrolyzing the alloy according to the method of this invention, gives more beneficial results than addition of alkali to the reaction mixture. The explanation of this is not apparent except that alkali acts probably in some manner in conjunction with the catalyst rather than with the materials undergoing hydrogenation.

The proportion of the active catalytic metal such as nickel, cobalt, iron, copper, etc., which is present in the alloy in combination with magnesium, aluminum, or an alkaline-earth metal prior to hydrolysis is to be controlled by results obtained by previous experience with catalysts of this type in promoting the particular reaction. Generally the content of active catalytic metal may vary from about 10% to 85% and the magnesium, aluminum or alkaline-earth-metal content may vary from about 90% to 15%. A preferred catalyst of nickel and magnesium is one containing one part of nickel to two parts of magnesium.

Organic liquids in the presence of which the catalyst can be prepared include toluene, nitrobenzene, aniline, pyridine and other amines, etc. Preferably the liquid used is that which is to be subsequently hydrogenated or reacted. However, in the case of hydrogenating phenol to cyclohexanol I have obtained good results by preparing the catalyst in the presence of aniline.

Hydrogenation reactions for which the catalysts of the present invention are eminently suitable include the conversion of nitrobenzene to aniline, aniline to cyclohexylamine and dicyclohexylamine, toluidines to methylcyclohexylamines, phenol to cyclohexanol, aminodiphenyl to aminodicyclohexyl, pyridine to piperidine, piperazine to tetrahydropiperazine, benzene to hexahydrobenzene (cyclohexane), naphthalene to tetrahydronaphthalene and decahydronaphthalene, and the hydrogenation of olefins, oils, fats and waxes. Typical results illustrating such hydrogenation reactions are shown hereinafter.

Amination is the reaction whereby an olefin or a hydroxyl-containing organic compound is converted to an amino compound by reaction with ammonia gas or ammonia-containing gases under pressure. Typical amination reactions for which the catalysts of the present invention are eminently satisfactory include the conversion of butanol to butylamine and the conversion of amylene to amylamine.

Deamination, or, as it is sometimes called, deammoniation, is the reaction whereby ammonia is split out of an amino compound or ammonia is split out between two organic compounds, one of which contains an amino group. Such reactions include, for example, the reaction of cyclohexylamine and aniline to give cyclohexylaniline with the liberation of ammonia, or the reaction of cyclohexylamine to yield dicyclohexylamine and ammonia. Such reactions include, in general, conversions of aliphatic and aromatic primary amines to secondary and tertiary amines and conversions of mixtures of aliphatic primary amines, mixtures of aromatic primary amines, and mixtures of aliphatic and aromatic primary amines to secondary and tertiary amines by condensation with elimination of ammonia. For these reactions the catalysts of the invention are especially adaptable.

An example illustrative of the methods of using the catalysts and advantageous results accruing therefrom is the hydrogenation of aniline to cyclohexylamine, which follows:

One part of granular particles of an alloy consisting of 33⅓% of nickel and 66⅔% of magnesium is added to 5 parts by weight of aniline. To this mixture is added exactly 1 part by weight of tap drinking water, a quantity just sufficient to convert the magnesium in the alloy to magnesium hydroxide. The batch is then heated in a closed reactor to maintain a reflux at 98° to 100° C. When the water in the mixture has been consumed, as indicated by the appearance of the mixture, the temperature of the batch is raised to 140° C. Approximately 20 hours are required for the hydrolysis.

To 167 parts of aniline in an autoclave provided with a stirrer is added the entire mass of catalyst prepared above. The mass is raised to a temperature of 235° C., while stirring, and hydrogen is passed into the mass under a pressure of 900 pounds per square inch until no further absorption of hydrogen takes place. From the mass are then distilled the unreacted aniline, cyclohexylamine, dicyclohexylamine and other products. Prior to the distillation the catalyst can be removed by filtration and recovered. The yield of cyclohexylamine is approximately 140 parts by weight.

In the hydrogenation of aniline the catalyst as above prepared gives conversions of from 70% to 90% or more of the aniline when used in those proportions. The ratio of cyclohexylamine to products boiling at a higher temperature is about 40 to 1. This ratio drops to about 25 to 1 for batches in which the catalyst was reused with the addition of small proportions of fresh catalyst. The so-called products boiling at a higher temperature than cyclohexylamine which are obtained consist of about 70% dicyclohexylamine.

Greater proportions of catalyst than hereinabove specified may be used. In comparison with catalyst prepared in the usual manner, that is, by hydrolysis in water and washing, the yields are such that 1 part of the nickel-magnesium alloy will produce 35 parts of cyclohexylamine whereas operating in the above manner with the improved catalyst 1 part of the alloy yields 140 parts of cyclohexylamine.

Whereas it is impossible with wet catalysts that were used heretofore to increase the yield of aniline converted to cyclohexylamine by adding greater proportions of wet catalyst, it has been found that the proportions of catalyst prepared by stoichiometric hydrolysis can be increased with a corresponding increase in yield of cyclohexylamine. In this manner substantially quantitative conversion and yield of cyclohexylamine from aniline can be realized.

In the hydrogenation reaction, various activating materials may be added to the batch, such as alkalies, for example, calcium hydroxide, sodium hydroxide, sodium carbonate and the like but I prefer to add the alkali to the water used for hydrolyzing the alloy as hereinbefore described.

It has been established that, if 1% water be added to the aniline charged, the yield of cyclohexylamine is 60% whereas the hydrogenation under the same conditions without added water gives a yield of about 75% cyclohexylamine. Catalyst made by using 5% less than the stoichiometric proportion of water gives a yield corresponding to 63% cyclohexylamine.

By the use of the dry catalyst as prepared according to this invention the reaction temperature can be reduced 10° to 15° C. lower than that possible to obtain satisfactory hydrogenation with a wet catalyst prepared by the usual hydrolysis procedure.

As a result of water which is generally present in catalysts made by the usual hydrolysis procedure, cyclohexanol is a by-product of the hydrogenation of aniline. Water is also present in the product and requires special treatment for its removal before distillation. By using the improved catalyst of the present invention substantially no cyclohexanol is formed as a by-product and no substantial amount of water is present in the reaction product before distillation. Recovery is simplified as a consequence.

Inasmuch as the foregoing description comprises preferred embodiments of the principles of my invention, it is to be understood that these embodiments are merely exemplary and not restrictive, and that these conditions may be varied in manners obvious to those skilled in the art without departing from the invention or the scope of the appended claims.

I claim:

1. A process of preparing a catalyst for liquid-phase reactions which comprises forming an alloy of a catalytic metal with a hydrolyzable metal and hydrolyzing said alloy in the presence of an organic liquid with an amount of water approximately equivalent stoichiometrically to the amount of hydrolyzable metal in the alloy.

2. The process as defined in claim 1 and further characterized in that the catalytic metal is selected from the group consisting of nickel, cobalt, and iron.

3. The process as defined in claim 1 and further characterized in that the hydrolyzable metal is selected from the group consisting of magnesium, alkaline-earth metals and aluminum.

4. A process for preparing a catalyst for liquid-phase reactions which comprises forming an alloy of nickel and magnesium and hydrolyzing said alloy in the presence of an organic liquid with an amount of water approximately equivalent stoichiometrically to the amount of magnesium in the alloy.

5. A process for preparing a catalyst for liquid-phase hydrogenation reactions which comprises forming an alloy consisting of approximately 66⅔% magnesium and approximately 33⅓% nickel and hydrolyzing said alloy by heating it in the presence of aniline with water in an amount equivalent approximately to the weight of the alloy.

6. In the process of preparing a catalyst of the hydrolyzed nickel-aluminum type, the improvement consisting in hydrolyzing the alloy of the catalytic metal and the hydrolyzable metal in the presence of an organic liquid with an amount of water approximately equivalent stoichiometrically to the amount of hydrolyzable metal in the alloy.

7. The method of making a catalyst suitable for liquid-phase reactions which comprises forming an alloy of a catalytically-active metal with a hydrolyzable metal and hydrolyzing said alloy in the presence of the liquid to be reacted with an amount of water approximately equivalent stoichiometrically to the amount of hydrolyzable metal in the alloy.

8. A hydrogenation catalyst suitable for liquid-phase hydrogenation which consists of a hydrolyzed alloy of a catalytically active metal and a hydrolyzable metal in suspension in an organic liquid, which catalyst was prepared by the hydrolysis of the alloy with an amount of water stoichiometrically equivalent to that required for hydrolysis of the hydrolyzable metal and contains the hydrolysis products of the hydrolyzable metal.

9. A hydrogenation catalyst suitable for liquid-phase hydrogenation which consists of a hydrolyzed alloy of a catalytically active metal selected from the group consisting of nickel, cobalt and iron, and a hydrolyzable metal selected from the group consisting of magnesium, aluminum and alkaline-earth metals in suspension in the liquid to be hydrogenated, which catalyst was prepared by the hydrolysis of the alloy with an amount of water stoichiometrically equivalent to that required for hydrolysis of the hydrolyzable metal and contains the hydrolysis products of the hydrolyzable metal.

10. A catalyst suitable for the liquid-phase hydrogenation of organic compounds, which consists of a hydrolyzed alloy of nickel and magnesium in suspension in the liquid to be hydrogenated, which catalyst was prepared by the hydrolysis of the alloy with an amount of water stoichiometrically equivalent to that required for hydrolysis of the hydrolyzable metal and contains the hydrolysis products of the hydrolyzable metal.

11. A catalyst suitable for the liquid-phase hydrogenation of organic compounds which consists of a hydrolyzed nickel-magnesium alloy in suspension in aniline, the nickel and magnesium having been present in the alloy in the original ratio of approximately 1 to 2 parts by weight, which catalyst was prepared by the hydrolysis of the alloy with an amount of water stoichiometrically equivalent to that required for hydrolysis of the hydrolyzable metal and contains the hydrolysis products of the hydrolyzable metal.

12. In the method of catalytically hydrogenating aniline in the liquid phase, the improvement whereby increased yields of cyclohexylamine are obtained, characterized in that the hydrogenation is conducted in the presence of a catalyst prepared by the hydrolysis in an organic liquid of an alloy of a catalytically active metal and a hydrolyzable metal with an amount of water stoichiometrically equivalent to that required for hydrolysis of the hydrolyzable metal.

13. In the method of catalytically hydrogenating ortho-toluidine in the liquid phase, the improvement whereby increased yields of 2-methylcyclohexylamine are obtained characterized in that the hydrogenation is conducted in the presence of a catalyst prepared by the hydrolysis in an organic liquid of an alloy of a catalytically active metal and a hydrolyzable metal with an amount of water stoichiometrically equivalent to that required for hydrolysis of the hydrolyzable metal.

14. In the catalytic liquid-phase hydrogenation of a hydrogenatable organic compound, the improvement consisting in conducting the hydrogenation in the presence of a catalyst prepared by the hydrolysis in an organic liquid of an alloy of a catalytically active metal and a hydrolyzable metal with an amount of water stoichiometrically equivalent to that required for hydrolysis of the hydrolyzable metal.

JOHN H. HAHN.